UNITED STATES PATENT OFFICE.

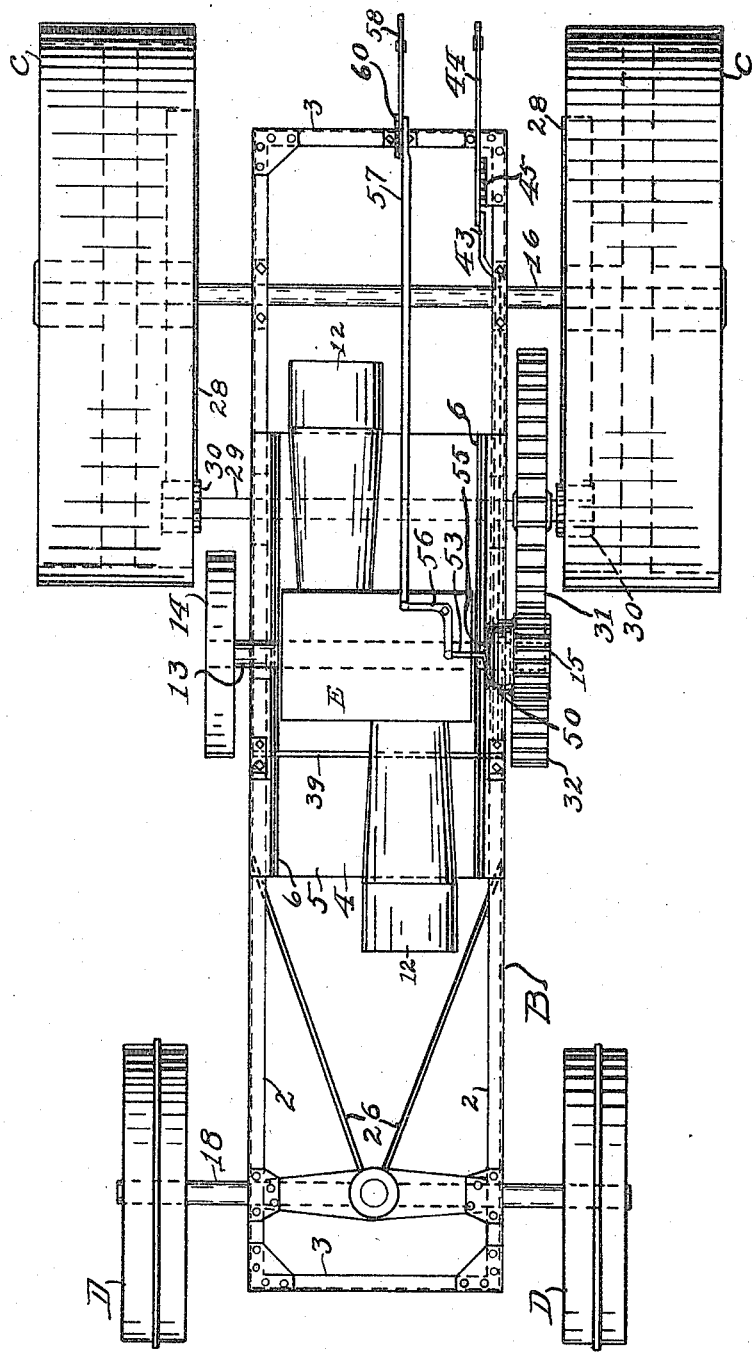

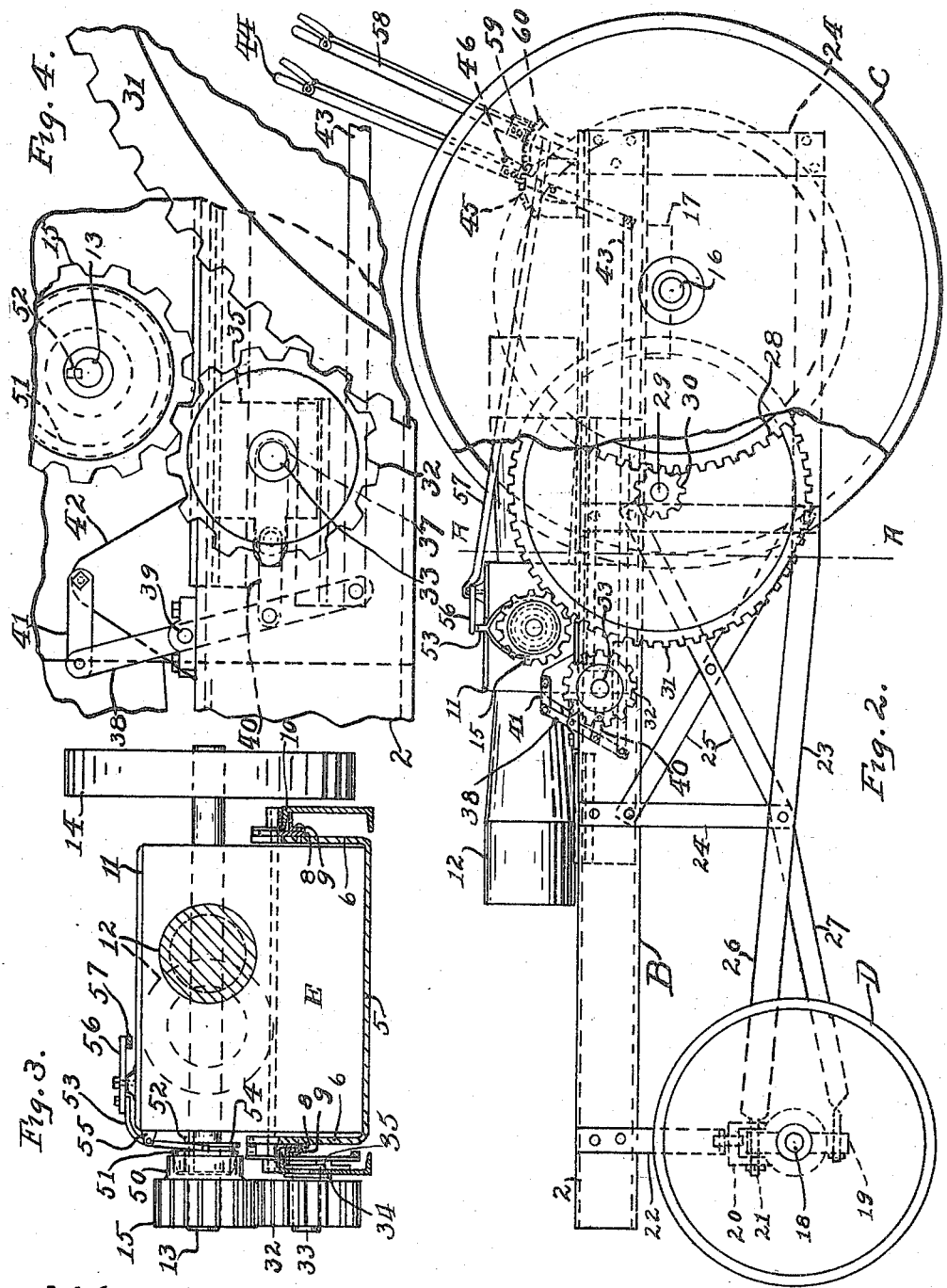

ALBERT O. ESPE, OF CROOKSTON, MINNESOTA, ASSIGNOR TO AVERY COMPANY, OF PEORIA, ILLINOIS, A CORPORATION OF ILLINOIS.

TRACTOR.

1,185,076.  Specification of Letters Patent.  Patented May 30, 1916.

Application filed February 6, 1911. Serial No. 606,719.

*To all whom it may concern:*

Be it known that I, ALBERT O. ESPE, a citizen of the United States, residing at Crookston, in the county of Polk and State of Minnesota, have invented a new and useful Improvement in Tractors, of which the following is a specification.

My invention relates to traction engines or tractors and more especially to tractors provided with internal combustion engines, as tractors of this type present problems not incident to steam traction engines. One of these problems is the provision of a suitable reversing gear, it not being possible to reverse an internal combustion engine in the manner that a steam engine may be reversed. Another problem is the provision of means arranged to permit the engine to be started before being connected to the drive wheels of the tractor, as an internal combustion engine cannot start under load in the manner that a steam engine can and means making possible the starting of the engine before it is connected to the tractor wheels to enable the operator to speed his engine when desired, and to store the energy thereof in the fly wheel to be utilized upon the connection of the engine to the tractor wheels.

The principal objects of my invention are, therefore, to provide an improved traction engine construction having its parts so arranged that the engine may be readily disconnected for starting or for the accumulation of energy and that the engine may be readily connected to the drive wheels for turning them in either direction as the operator may desire.

In carrying out my invention I have provided a tractor having an engine which is slidably mounted on the main tractor frame in a manner to permit a pinion on the engine shaft to be brought into or out of mesh with a gear wheel which is connected to the drive wheels. The pinion is loose on the engine shaft and a friction clutch is provided by means of which the pinion can be connected to the shaft at the will of the operator. In order that the tractor may be reversed I have provided a movable idler pinion which can be brought into mesh with the drive pinion and main gear when the pinion and gear are out of direct engagement with each other.

The construction which I have provided is not only very simple, but entirely avoids the objectionable axial movement of the gears which is common in many motor driven vehicles. By means of this construction which will be hereinafter described in detail, I am enabled to disconnect the engine from the gearing at any time and by first disconnecting the engine I am enabled to shift the gearing from forward driving position to backward driving position without being in danger of stripping the gear teeth.

In the drawings with which I have illustrated my invention and which form part of my specification, Figure 1 is a plan of the tractor; Fig. 2 is an elevation; Fig. 3 is a section on the line A—A, Fig. 2, and Fig. 4 is an enlarged detail of the sliding pinion.

In the construction shown in the drawings, the frame B of the tractor is made up of channel beams 2 placed on edge with their backs out, the beams being connected at their ends by end pieces 3 and supported by the wheels C and D. The engine E rests in a slide frame 4 having a bed 5, and sides 6 on which are slides formed by the outstanding legs of the angles 8 and 9 riveted to the sides 6. The slides thus formed embrace the flanges 10 of the channels 2 of the frame B. The slides allow the movement of the engine E and frame 4 longitudinally of the frame B. The engine E is of a common two cylinder type having a crank case 11 and cylinders 12 or may be of any other form desired. On one end of the crank shaft 13 of the engine there is a fly wheel 14 and on the other end there is a pinion 15. The wheels C are mounted on the axle 16 which is journaled in boxes 17 attached to the frame B near its rear end. The wheels D are journaled on an axle 18 which is pivoted on the vertical pin 19 allowing a steering movement of the front wheels which may be effected in any suitable manner. The pin 19 carries a rocker 20 pivoted on it by the pin 21 and on the rocker 20 there is a bolster frame 22 supporting the frame B. A truss frame 23 with posts 24 and braces 25 serves to support the engine load on the frame B, while the braces 26 and 27 at the upper and lower ends of the pin 19 brace the front wheels D.

On each of the wheels C is a drive or bull gear 28. A shaft 29 journaled on the frame B carries at each end a pinion 30 meshing with the drive gear 28 on its side of the tractor. The shaft 29 also carries a large gear 31 which meshes with the pinion 15 of the engine E when the engine is in its normal position on the frame B. A forward movement of the engine and slide frame 4 throws the pinion 15 out of mesh with the gear 31 and stops the tractor. A pinion 32 is journaled on the stub shaft 33 which is attached to plates 34 and 35 sliding on opposite sides of the web of the adjacent channel 2, said web having a slot 37 to receive shaft 33 and permit the movement of the pinion 32 longitudinally of the frame B. The pinion 32 may be moved into engagement with the gear 31 and this movement is secured by a lever 38 mounted on the shaft 39 which extends across the width of the tractor and is journaled on the channels 2. A link 40 connects the lever 38 and plate 35 to move the pinion 32. The lever 38 extends above the shaft 39 and is connected by a link 41 to the lug 42 on the frame 4. The movement of the lever 38 produces movements of the pinion 32 and engine E in opposite directions so that throwing the pinion 32 into mesh with the gear 31 throws the pinion 15 out of mesh therewith and the parts are so positioned that the same movement throws the pinions 15 and 32 into mesh with each other. The pinion 32 is placed at such a distance from the gear 31 that the pinion 15 is out of mesh with the gear 31 before it meshes with the pinion 32 and before the pinion 32 meshes with the gear 31. The pinion 32 is shifted by a link 43 connecting with a hand lever 44 which is pivoted on the frame B and is provided with a rack 45 and spring latch 46.

In connection with the pinion 15 is a friction clutch 50. One element of the friction clutch is preferably formed integrally with the pinion and the other element 51 is keyed to the shaft 13 in a manner to permit longitudinal movement. A lever 53 operating in the collar 54 on the sliding-part 51 of the clutch, serves to actuate the clutch to connect or disconnect the pinion with the shaft 13 and the engine E. The lever 53 is pivoted on the lug 55 on the engine casing 11 and its free end is connected with a bell crank 56 mounted on the engine casing 11 and operated by a link 57 connected to the hand lever 58 which is pivoted to the frame B. The connection between the lever 53 and the bell crank 56 is a loose one and this loose connection makes possible the slight movement which is necessary to effect engagement or disengagement of the friction elements of the clutch. The lever 58 is provided with a spring latch 59 and rack 60 and its operation through the bell crank 56 connects and disconnects the pinion 15 and the engine E.

Under some circumstances it is desirable to disconnect the traction wheels entirely from the prime pinion on the engine shaft. The gear wheels are all positively connected by interlocking teeth, and in order to generate high momentum the gearing should be disconnected from the shaft as far as possible. At such times both the prime pinion 15 and the supplemental reversing pinion 32 are brought to their neutral positions, that is where both are out of engagement with the frame mounted wheel 31. The engine shaft is thus freed of load or strains from the heavier gears and the momentum storing fly wheel can be set into rapid rotation. Then the prime pinion 15 or the reversing pinion 32, being always in alinement with the wheel 31, can be moved into engagement with the latter according as the traction wheels are to be advanced or reversed. And then by means of the friction clutch the supplemental energy stored in the fly wheel can be gradually transmitted through the active pinion (15 or 32) to the ground wheels and impediments or resistances can be surmounted or overcome while such supplemental energy is continuing. All of the movements of both the prime power pinion and the supplemental reversing pinion are effected by the simple movements of the engine. All requirements for either advancing or reversing are met by the two simple toothed pinions 15 and 32.

Explosive or internal combustion engines, such as that illustrated, are heavy and are, normally, speeded slow to avoid the vibrations and jarrings resulting from high speeds. For numerous reasons their parts are so adjusted and related that the power ordinarily developed is relatively low, the engine shown in the drawings developing, normally, from ten to twelve horse power. But a heavy fly wheel, of several hundred pounds weight, if its speed of rotation be raised to five or six hundred revolutions per minute (after freeing the engine shaft and speeding it up) is found to store an energy of from forty to fifty horse power which (supplemental to the ten or twelve horse power being currently generated) is available, through the clutch, for two or three seconds; and by the friction clutch which I employ I can utilize this large increase of power to overcome obstructions in front of the drive wheels, or cause them to roll out of depressions, where they would be immovable if only the power normally generated be exerted upon them. Positively interlocked or meshing gears are necessary to transmit such power for two or three seconds, none of the friction gears with which I am familiar being available for this purpose. And yet, on the other hand, the toothed, positively interlocked, gearing would itself be useless except for the friction clutch by which the severe strain from the high momentum can be gradually transmitted through the prime pinion or the reversing pinion and the gear train to the loaded ground wheels.

In operation let it be supposed that it is desired to drive the tractor in the forward direction. The gearing will then be in the position shown in Fig. 2 and the operator by throwing the lever 58 forward can disconnect the pinion 15 from the engine shaft. The engine is then entirely free and can be manually started by means of the fly wheel 14. After the engine is in satisfactory operation it can be gradually and smoothly connected to the driving wheels by a careful throwing in of the friction clutch. If at any time on a grade or under other severe haulage conditions, the engine becomes stalled it can be made free for starting simply by releasing the clutch without any shifting of the gears. In case unusual power is required to get the tractor out of a mud hole or over a stump or other obstruction, or for any other purpose, it can be obtained by first throwing out the clutch and permitting the engine to speed up. Then by carefully throwing in the clutch the inertia of the engine and the fly-wheel can be utilized for applying a powerful driving force to the main wheels. When it is desired to reverse the tractor, this can be done without stopping the engine and without any danger of stripping the gears. The operator first releases the friction clutch and then by means of the hand lever 44 causes the movement of the pinion 15 out of mesh with the gear 31 and simultaneously causes the movement of the pinion 32 into mesh with the gear 31 and the pinion 15. Then by causing the clutch to be again engaged, the tractor can be started in the backward direction.

Having described my invention, what I claim as new and desire to protect by Letters Patent is:—

1. The combination of the main frame having fixed rectilineal slide guides, the traction wheels, the train of toothed intermeshing traction-wheel drive gears (including a prime power pinion) all positively locked, rotatively, together, a sliding explosive engine on said slide guides having a shaft carrying (a) said power pinion loose on the shaft (b) a momentum wheel rigid with the shaft and (c) a manually controlled friction clutch for gradually actuating the pinion, and means for sliding the engine bodily to carry the pinion from or to its position of locking with the other gears; said parts being arranged to permit (1) the pinion to be moved out of toothed engagement with the gear train, (2) the speeding up of the shaft to store energy in said momentum wheel, (3) the moving bodily of the engine the rapidly rotating shaft and the idle pinion back to positively intermesh the pinion with the gear train, and (4) the gradual transmission of momentum from the momentum wheel the shaft and prime pinion, through the interlocked gear train, to the traction wheels.

2. The combination of the main frame having fixed rectilineal slide guides, the traction wheels, a sliding explosive engine mounted on said slide guides, a prime pinion mounted loosely on the engine shaft, a friction clutch for connecting the pinion to the shaft, means for sliding the engine and pinion on the frame, a gear mounted on the main frame and positively connected permanently with the prime pinion when the latter is in one position and to be disengaged therefrom when it is in another position, a supplemental bodily movable toothed reversing pinion mounted on the frame independently of the prime pinion and adapted to mesh with the prime pinion and with the aforesaid frame-mounted gear, both the pinions being arranged to be placed simultaneously in neutral positions to permit the free rotation of the disconnected engine shaft to store up energy in said momentum wheel and to have either of said pinions at option move, while the shaft is rotating, into engagement with the frame-mounted gear and to thereafter gradually transmit momentum from the friction clutch and from said momentum wheel to the traction wheels either for advancing or reversing them.

3. The combination with the main frame and the traction wheels therefor, of the engine supported and arranged to slide longitudinally on the frame and having a transversely arranged shaft with a rigidly attached momentum wheel and a loosely mounted toothed prime pinion, a friction clutch for connecting the pinion to said shaft, means for sliding the engine and the pinion relatively to the main frame, a toothed gear wheel mounted on the frame and connected with the drive wheels and positioned to be engaged by the said prime pinion when it is in one position and to be disengaged from said pinion when it is in another position, a supplemental reversing pinion mounted on and movable relatively to the main frame, and means for moving the supplemental reversing pinion bodily to bring it into engagement with the prime pinion and with the frame mounted gear when the prime pinion is out of direct engagement with said gear.

4. In a tractor, the combination of a main frame, ground engaging driving and steering wheels upon which the frame is supported, drive mechanism connected to the driving wheels and comprising a main toothed drive gear mounted for rotation about a transverse axis, an internal combustion engine mounted for movement longitudinally of the main frame and arranged with its main power shaft lying transversely, a toothed drive pinion freely mounted on the power shaft of the engine and axially fixed thereon in position to be moved into and out of mesh with the said drive gear when the engine is bodily moved, means additional to the said drive pinion for turning the engine to start it, a friction clutch operable at will to connect the drive pinion to the engine shaft for rotation therewith, a rotatable intermediate toothed pinion mounted on a transverse axis, the pinion being fixed against axial movement but movable longitudinally of the main frame into mesh with the drive gear and drive pinion when the pinion is out of mesh with the gear, and out of mesh with the said gear and pinion when the pinion is in mesh with the gear, and manually controllable devices for moving the engine to bring the drive pinion into and out of mesh with the drive gear and for bringing the intermediate pinion out of and into mesh with the drive pinion and drive gear.

In testimony whereof, I have signed my name to this specification, in the presence of two subscribing witnesses.

ALBERT O. ESPE.

Witnesses:
WM. P. MURPHY,
J. A. ANDERSON.

Copies of this patent may be obtained for five cents each, by addressing the "Commissioner of Patents. Washington, D. C."